March 10, 1936.                M. ROMAINE ET AL                2,033,449
                              MACHINE TOOL MECHANISM
                               Filed June 28, 1933            6 Sheets-Sheet 1
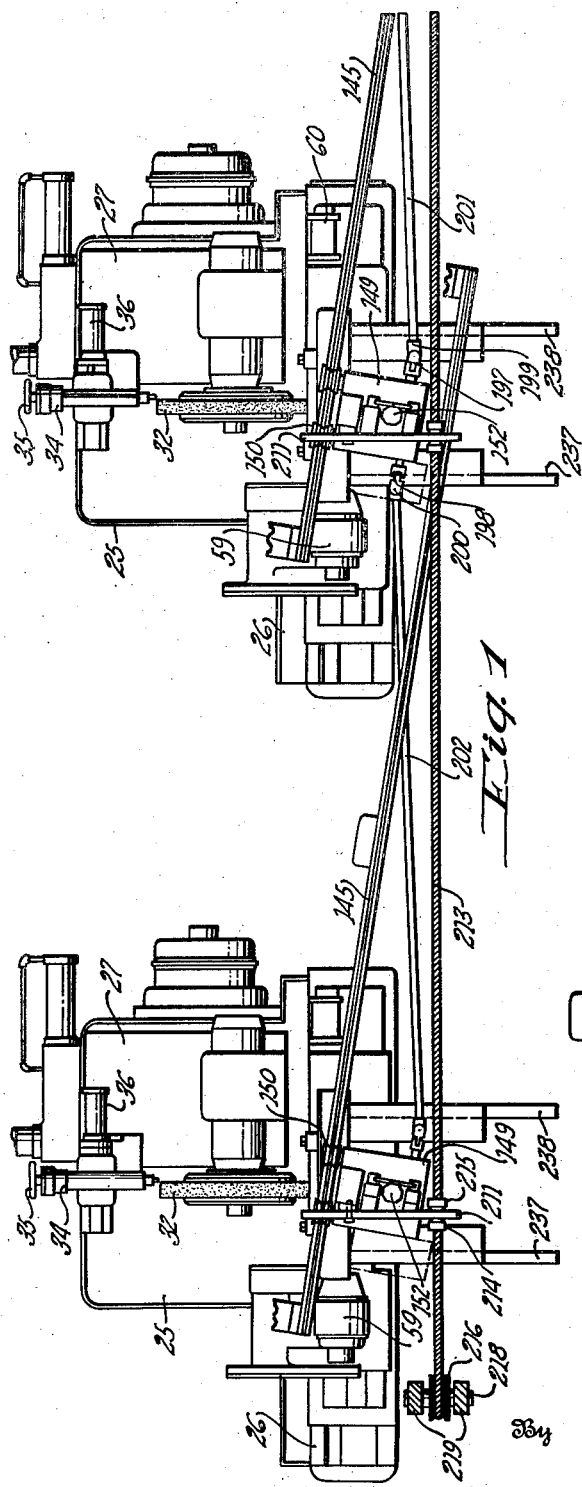

March 10, 1936.  M. ROMAINE ET AL  2,033,449
MACHINE TOOL MECHANISM
Filed June 28, 1933   6 Sheets-Sheet 2
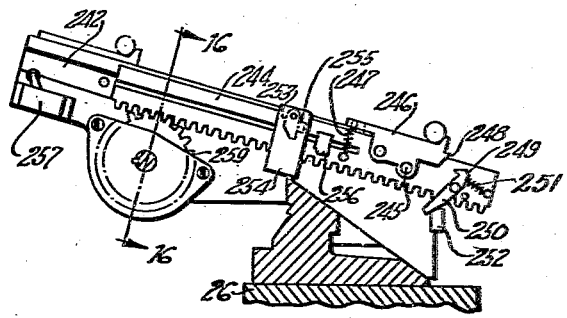
Fig. 7
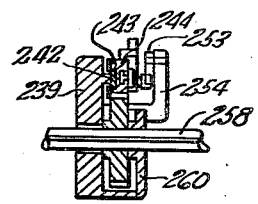
Fig. 16
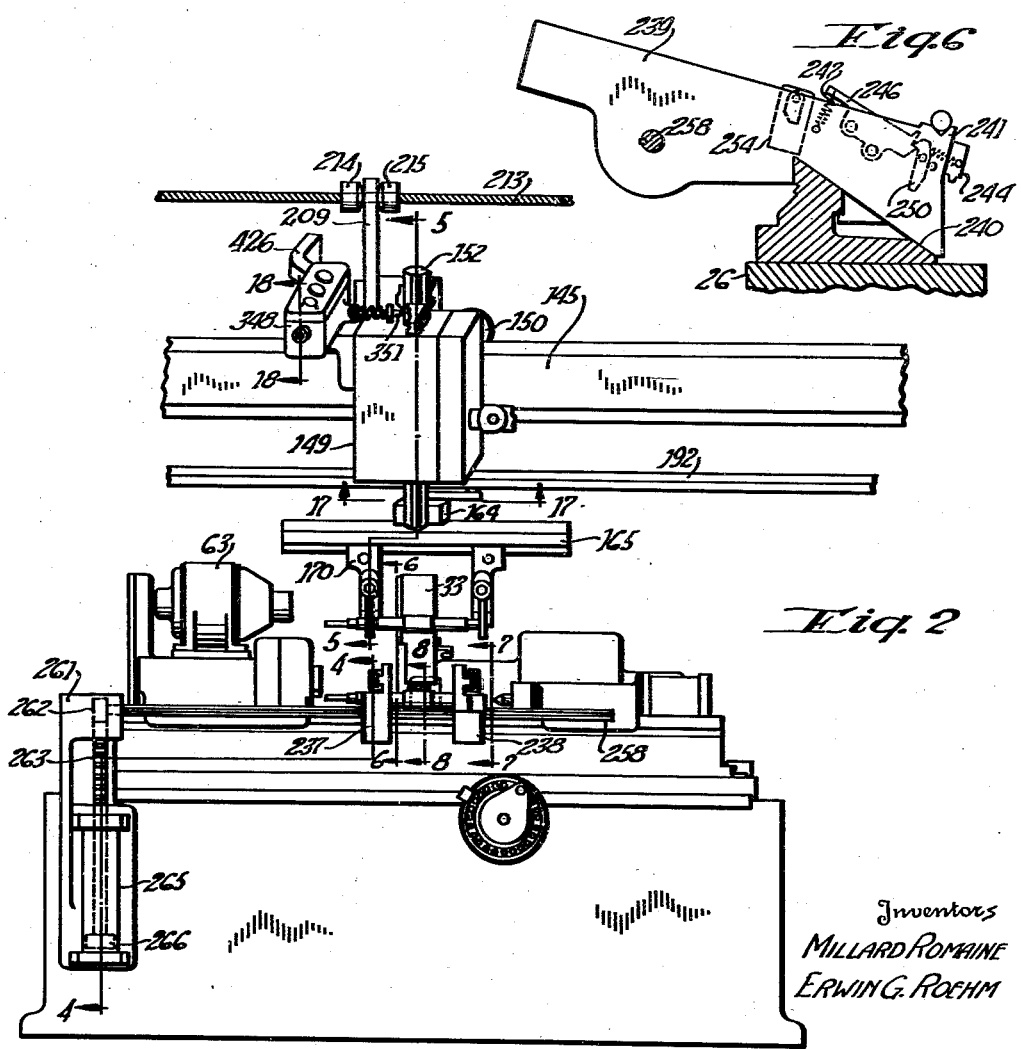
Fig. 6
Fig. 2
Inventors
MILLARD ROMAINE
ERWIN G. ROEHM
By A. K. Parsons
Attorney

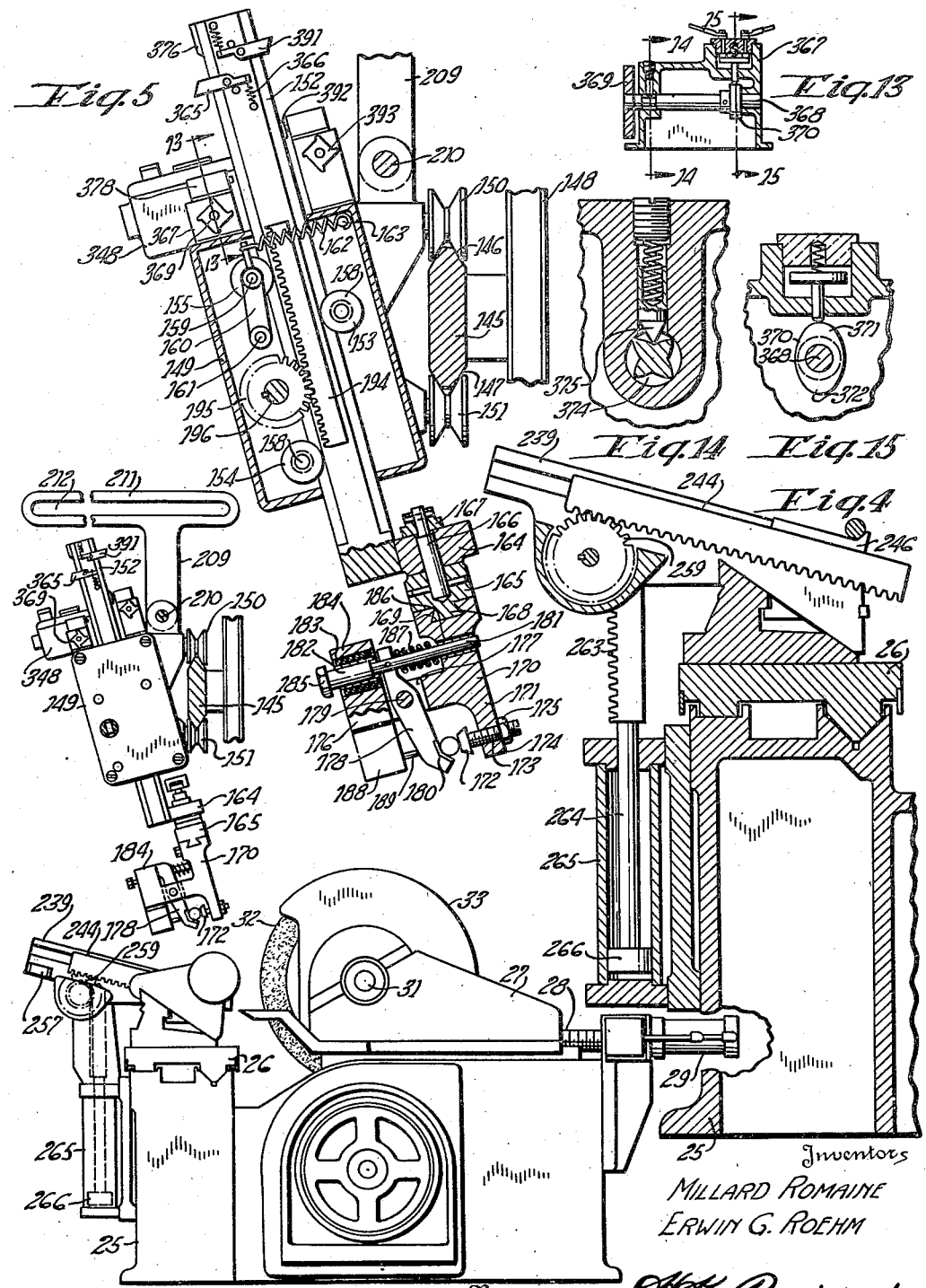

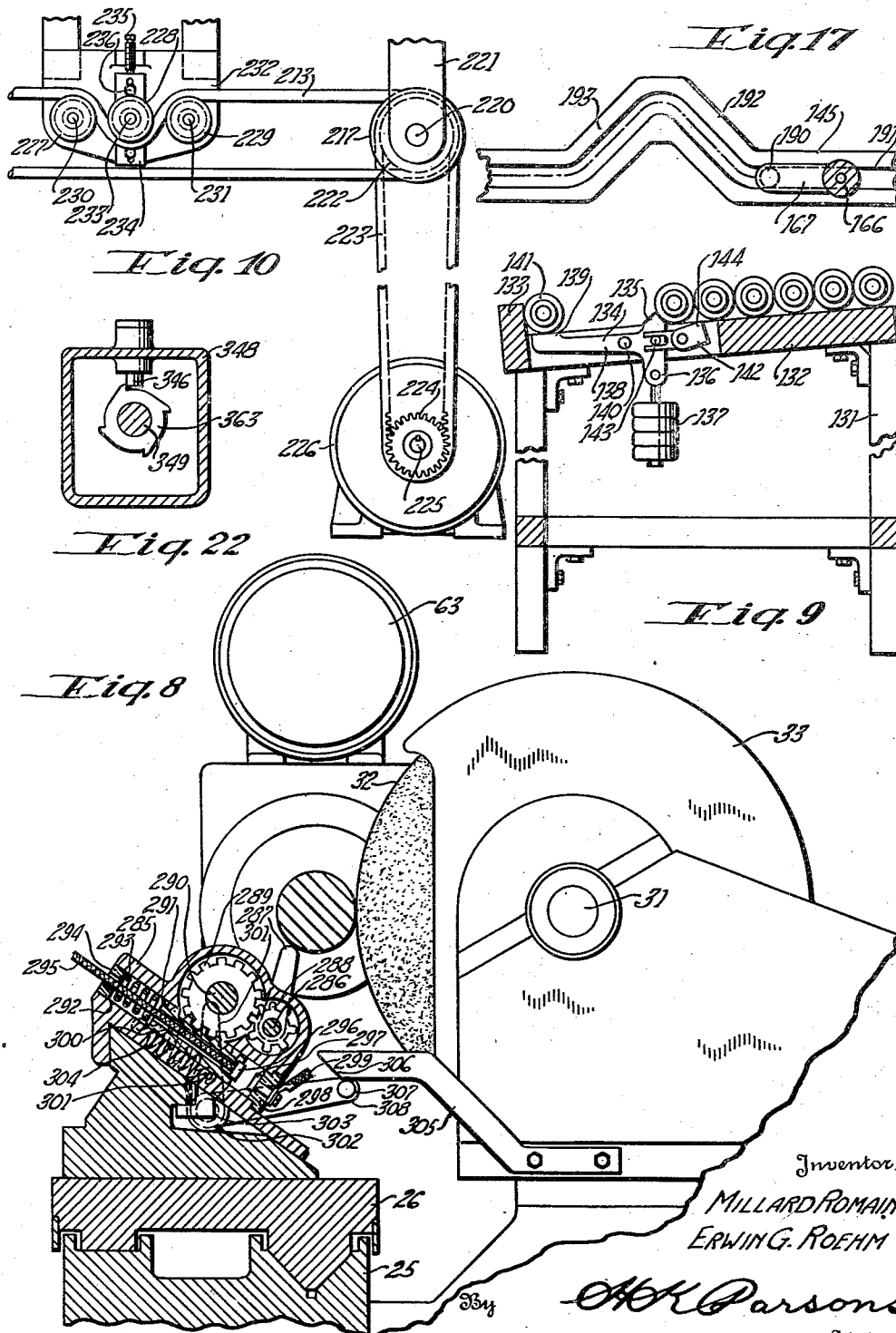

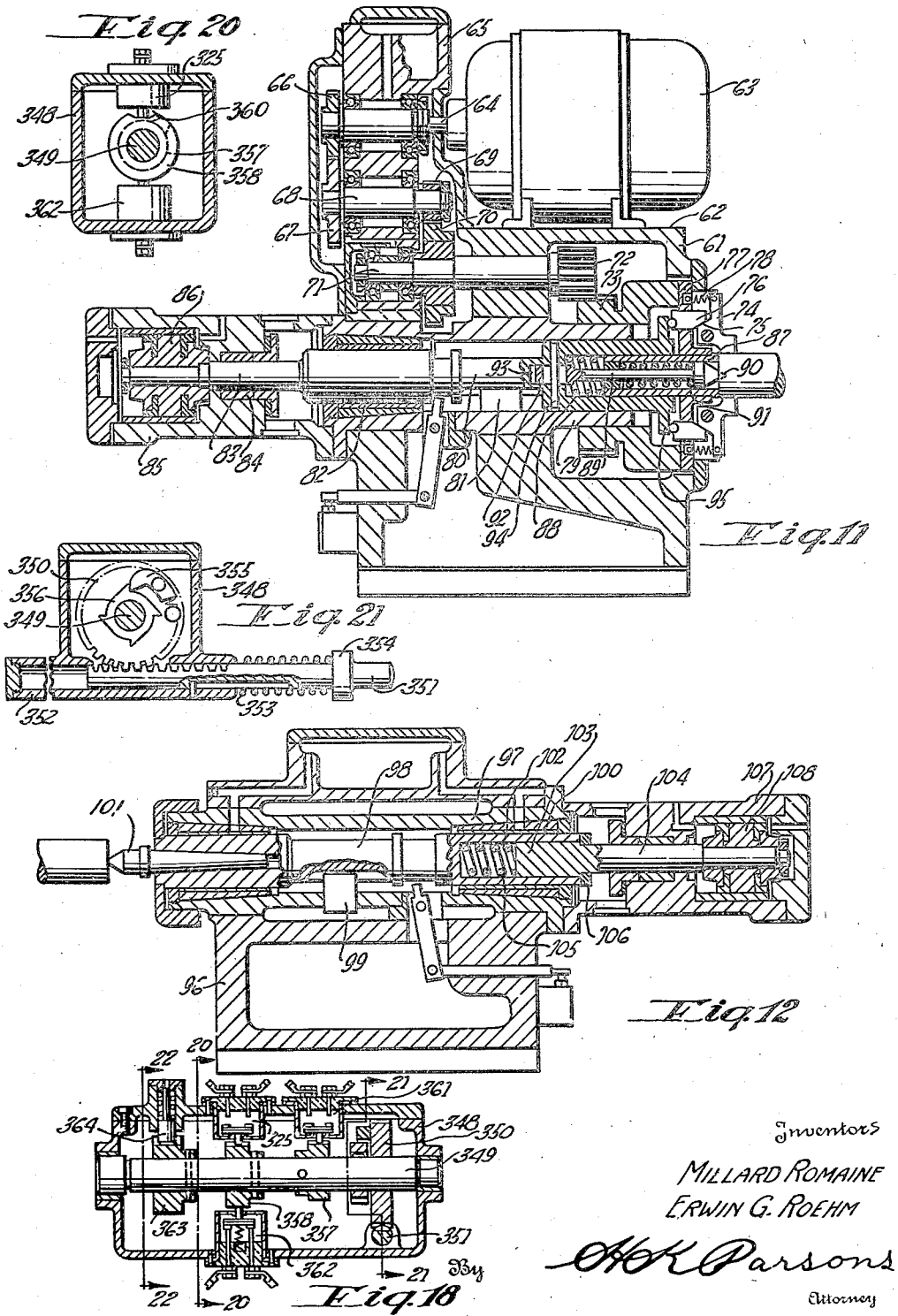

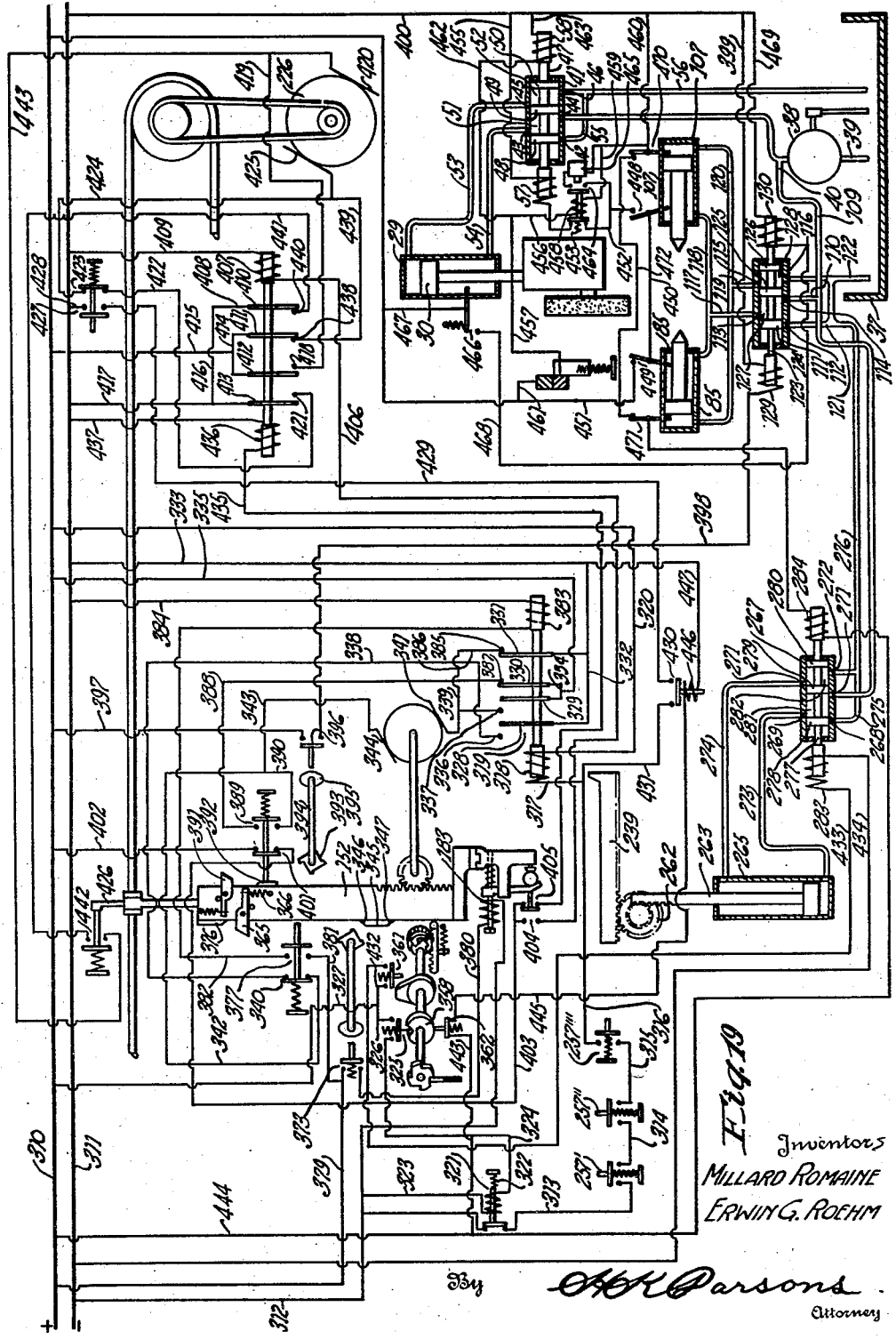

Patented Mar. 10, 1936

2,033,449

UNITED STATES PATENT OFFICE 2,033,449

MACHINE TOOL MECHANISM

Millard Romaine, Cincinnati, and Erwin G. Roehm, Norwood, Ohio, assignors to Cincinnati Grinders Incorporated, Cincinnati, Ohio, a corporation of Ohio Application June 28, 1933, Serial No. 678,052

35 Claims. (Cl. 29—27)

This invention relates to improvements in machine tool structures and particularly to improvements in manufacturing lines utilizing a plurality of individual machine tools and transferring mechanism for transferring work pieces from one machine to the next.

One of the principal objects of this invention is the provision of a mechanism for expeditiously performing successive operations on a given work piece whereby to complete said work piece in a minimum of time.

Another object of the invention is the provision of a mechanism as above referred to including a plurality of transfer mechanisms operable simultaneously between a raw material supply and a machine tool, between successive machines in the manufacturing line and between a machine and the final discharge point.

A further object of the invention is the provision of a transfer mechanism as above set forth so tied in or coupled with the machine tools as to be energized from the said machines.

It is also an object of this invention to tie in or couple each of the individual units of the transfer system whereby the said units are simultaneously actuated and operable in synchronous order to effect a continuous production from the machines and reducing the idle time of the machines to an absolute minimum.

Other objects consist in detailed mechanism co-operating to cause the system to function smoothly; to effect an end for end positioning of the work piece during the transferring thereof; combined and co-operating hydro-electrical circuits interlocked and interconnected to effect the functioning of control units sequentially and improved mechanism for generally improving a manufacturing line and insuring the maximum production therefrom while being operated in a safe manner.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

In the drawings:

Figures 1 and 1A illustrate in plan the improved transfer mechanism as associated with a plurality of machine tools, certain parts being cut away to more clearly illustrate the mechanism.

Figure 2 is a front elevation of one of the machine tools together with one of the transfer units.

Figure 3 is a side elevation of the mechanism disclosed in Figure 2.

Figure 4 is a fragmentary sectional view through a part of the operating mechanism as seen from line 4—4 on Figure 2.

Figure 5 is a sectional view through one of the transfer units as seen from line 5—5 on Figure 2.

Figure 6 is a side elevational view of the work cradle mechanism which is associated with each machine and as seen from line 6—6 on Figure 2.

Figure 7 is an elevational view of the other side of a duplicate mechanism of that shown in Figure 6 and as seen from line 7—7 on Figure 2.

Figure 8 is a combined sectional and elevational view through a sizing device as seen from line 8—8 on Figure 2.

Figure 9 is a sectional view through a raw work supporting table as seen from line 9—9 on Figure 1A.

Figure 10 is an elevational view of the power source of the transfer mechanism as seen from line 10—10 on Figure 1A.

Figure 11 is a longitudinal sectional view through a headstock as employed by one of the machines.

Figure 12 is a longitudinal sectional view through the tailstock which is disposed in opposition to the headstock of Figure 11.

Figure 13 is a sectional view through one of the switch mechanisms for intermittently closing a switch forming a detail of the control mechanism as seen from line 13—13 on Figure 5.

Figure 14 is a sectional view taken on line 14—14 on Figure 13.

Figure 15 is a sectional view taken on line 15—15 on Figure 13.

Figure 16 is a sectional view as seen from line 16—16 on Figure 7.

Figure 17 is a bottom plan view of a portion of the track associated with the transfer mechanism and utilized for effecting an end for end position of the work as seen from line 17—17 on Figure 2.

Figure 18 is a sectional view through a second switch mechanism operable by the work carrying member as seen from line 18—18 on Figure 2.

Figure 19 is a diagrammatic illustration of the electrical and hydraulic circuits employed in carrying forward this invention.

Figure 20 is a sectional view taken on line 20—20 of Figure 18.

Figure 21 is a sectional view taken on line 21—21 of Figure 18.

Figure 22 is a sectional view taken on line 22—22 of Figure 18.

Throughout the several views of the drawings, the same or similar reference characters are employed to denote the same or similar parts.

As was pointed out above, this invention has particular reference to mechanisms for transferring work pieces through the manufacturing line from machine to machine, each machine of which performs a different and particular operation on the work piece, all operations tending to result in a final completed piece. It will be understood that the functions of the different machines must be taken into consideration to control or effect the subsequent operations of the transfer devices. It will also be understood that a separate carrying or transferring unit for each machine is necessary so that the finished piece from each machine can be transferred to the next machine and placed in position for operation thereon.

For illustrative and descriptive purposes there are but three machine tools disclosed in the drawings, but it is to be understood that this line may be considerably increased to take in any number of different machines requiring merely the further duplication of the transfer units and an interlocking of the several mechanisms associated both with the transfer mechanism and the individual machine tools.

The drawings illustrate the invention as applied to and including a manufacturing line utilizing a milling machine at the beginning of the line and two grinding machines, but it is to be understood that the invention is not confined to these types of machines but may also include other types of machines, such as lathes, drills, station-type machines and in fact all other machine tools now in use. It is also to be appreciated that the machines are automatic in their operation, certain parts of which are described and illustrated, but additional automatic mechanism may be employed and in some cases would necessarily be included which is to be considered as within the purview of this invention where necessary. For example, in the case of grinding machines, the feed of the wheel and work must be automatic, the sizing of the work must be automatic, the trueing of grinding wheel which should take place periodically, may be automatic, and the compensation for wheel wear and the trueing thereof should also be automatically taken care of to avoid interruption in the continuous production and operation of this invention. It is to be understood, however, that certain of these units may be manually or otherwise operated instead of in a cyclic and automatic manner.

A machine tool will first be described in general and then specifically described with reference to a grinding machine, since as far as the present illustration is concerned the grinding machines would be slower in operation and control the initiation of the various steps in the cycle. Accordingly, each machine tool generally comprises a bed or main support 25 having mounted thereon for movement relative thereto a work table 26. In the present instance the table is more or less utilized for setting up purposes only and for supporting the work piece during the actual tooling operation. The bed 25, in addition supports a tool carriage 27 which is movable relative to the bed toward and from the table and work mounted thereon. Any suitable or desirable means may be employed for so shifting the carriage. As shown in the drawings and particularly in Figure 3, the said mechanism comprises a shaft or a screw 28 threaded into the carriage 27 and having its rear end entering a cylinder 29. The said mechanism is shown diagrammatically in Figure 19 and as there shown illustrates the screw 28 as a piston rod having secured to its inner end a piston 30 adapted to be acted upon by an hydraulic medium under pressure for reversely shifting same and consequently the carriage. The particular mechanism involved in the hydraulic circuit will be described in detail subsequently.

It is to be understood that the tool carriage 27 will carry the particular tool of the machine in question which tool will either be mounted directly on a spindle or a quill or other tool supporting member as would be usual with that type of machine. As shown in Figure 3 the carriage 27 has journaled in suitable bearings provided thereby, a spindle 31 to the free end of which is secured a grinding wheel 32. The wheel 32 is generally enclosed within a guard or hood 33 for confining the coolant and spray usual with grinding machines. As was noted above, it is frequently necessary to trim or true the face of the wheel for which purpose, see Figure 1, the carriage 27 has mounted thereon a trueing mechanism indicated generally by the numeral 34 and adapted to be actuated through the hand wheel 35 and a piston and cylinder mechanism 36. Any other type, however, of control or operating mechanism may be provided for operating the trueing tool.

For effecting and controlling the operation of the tool carriage, there is provided, see Figure 19, a tank 37 containing an hydraulic medium, preferably oil, adapted to be circulated through the hydraulic system by means of a suitable pump. This pump is indicated in Figure 19 by the numeral 38 and has extending therefrom the suction pipe 39 which terminates in the sump or tank 37. From the other side of the pump 38 is a pressure conduit 40 having its other terminus connected with a valve casing 41. The valve casing 1 is provided with ports 42, 43, 44, 45 and 46 and it is with the port 44 that pressure conduit 40 connects. Mounted within the casing 41 and shiftable relative thereto for connecting the ports in various combinations is a spool type of valve 47 having piston ports 48, 49, and 50 forming between them cannelures 51 and 52. Connected with the ports 45 is one end of a conduit 53 which has its other terminus connected with the upper end of the cylinder 29. Connected with the ports 43 is one end of a conduit 54, the other terminus of which connects with the lower end of the cylinder 29. The ports 42 and 46 are respectively connected with branch discharge conduit 55 and return conduit 56 that terminates in the sump or tank 37. As shown in Figure 19, the valve 47 is positioned to connect the pressure in the conduit 40 through the ports 44 and 43 with the conduit 54 thereby actuating the piston 30 in a direction to retract the grinding wheel from the work. The hydraulic medium on the other side of the piston is being discharged through the conduit 53 and ports 45 and 46 to the discharge conduit 56 and tank or sump 37.

The valve 47 is adapted to be power shifted and for this reason is provided on opposite ends with solenoids 57 and 58 which are included in an electrical circuit which will be described in detail later.

In order to support the work during the tooling operation thereon the machine tool table 26 supports at opposite ends head and tailstocks 59 and 60. With certain types of machine tools the work is held stationary during the tooling operation while with other types it is necessary to effect a rotation of the work during the tooling operation. The former type of mechanism would be used, for example, with the milling machine disclosed in the drawings, which is adapted to mill flats or keyways on the work prior to the grinding operation, while the latter, or rotating type of head and tailstocks is employed with lathes, grinding machines and the like. The rotating type of head and tailstocks is illustrated in the drawings in Figures 11 and 12.

As shown in Figure 11 the headstock comprises a housing or casing 61 having on its upper surface a prime mover or motor support 62 supporting the motor 63. The shaft 64 of the motor is journaled in a bracket 65 carried by the housing 61 and which in addition houses the gear or pinion 66 secured to the motor shaft 64 or an extension thereof. Meshing with the gear 66 is a gear 67 secured to one end of an intermediate shaft 68 also journaled in the bracket 65. The other end of the shaft 68 has secured to it a pinion 69 meshing with a ring gear 70 keyed or otherwise secured to a pinion shaft 71 rotatably journaled in the bracket 65 and housing 61. The inner end of the pinion shaft 71 extends interiorly of the housing 61 and has formed integral therewith or secured thereto the driving pinion 72 meshing with the driven gear 73. The driven gear 73 is shown integral with a chuck mechanism to which are pivoted the chuck or clamp arms 74. The clamp arms 74 are each provided on its rear surface with a cam face 75 co-operating with cam faced actuating dog 76 slidably carried by a spider member 77. In order to release the dogs they are each provided with a spring 78 having one end secured thereto and the other end secured to the spider 77.

The gear 73 and chuck are rotatably journaled on a boss or bearing 79 integral with the housing 61. Extending through a bore in the said boss or bearing 79 is a spindle 80 held against rotative movement by a key 81. The spindle 80 in addition is mounted in a bearing 82 for guiding purposes and beyond the said bearing, the spindle is reduced as at 83 where it extends through a stuffing box and cylinder head 84 secured in any desirable manner to the housing 61. The reduced end 83 of the spindle within the cylinder 85 has secured to it a piston 86 which is adapted to be axially shifted for correspondingly shifting the spindle 80.

The forward end of the spindle is provided with a counterbore in which is slidable a guide sleeve 87 which has abutting on its free end one end of a spring 88, the other end of which is seated against the base of the counterbore. The inner end of the sleeve 87 is bored and has projecting therethrough the stem 89 of a center 90 which fits the interior of the bore in the sleeve 87. Surrounding the center-stem 89 and enclosed within the sleeve 87 is a spring 91 which abuts on opposite ends with the closure of the sleeve and the center 90. The springs 88 and 91 are of different strength, the spring 91 being the stronger whereby it will shift the center before the spring 88 has an opportunity to shift the sleeve. In other words, the spring 91 will effect a shifting of its part to the limit of its movement whereupon it will compress the spring 88 as will later appear. The center-stem 89 is provided on its inner end with a slotted head 92 received in a socket 93 formed in the spindle 80 and the spindle has a pin 94 extending therethrough which passes through the slot in the head 92 whereby axial movement of the spindle correspondingly shifts the center.

In addition, the spindle 89 is provided on its outer end with a flange 95 that engages the rear ends of the cam faced actuating dogs 76 for shifting same in a direction to actuate the chuck dogs 74.

The operation of these parts is as follows: the sleeve 87 normally projects beyond the center 90 which is effected by the spring 88 after the spring 91 has shifted the center 90 to take the clearance between the slot in its head 92 and the pin 94. After a work piece is mounted in position it is taken up by the centers and clamped in the chuck by the piston 86 which is actuated to the right thereby shifting the spindle and parts carried thereby. The initial movement of these parts will cause the flanged end of the sleeve 87 to engage with the work and thereby limit its movement toward the work. Continued movement of the spindle will then push the center beyond the sleeve into the previously formed center bore in the end of the work causing the said center 90 to pick up the work and align it with the tailstock center to be later described. By the time the work is properly mounted on the center 90 the flange 95 on the end of the spindle is contacting with the cam faced actuating members 76 which through the dog cams 75 cause the jaws 74 to engage with and clamp the work in the chuck for rotation through the train above described, extending from the prime mover or motor 63.

The tailstock shown in Figure 12 comprises a housing 96 mounted on the work table in opposition to the headstock housing 61 and has mounted therein a sleeve 97 in which is disclosed a spindle 98. The spindle 98 is held against rotative movement by a key 99 and is carried for sliding movement in bearings 100 in turn supported by the sleeve 97. The inner end of the spindle 98 is provided with the usual tapered bore supporting a center 101 that is in axial alignment with the headstock center 90. The rear end of the spindle 98 is counterbored as at 102 in which is disposed the plunger end 103 of a piston rod 104. The plunger 103 is of less length than the counterbore thereby providing a chamber between the inner end of the plunger and the base of the counterbore. In this chamber is disposed a spring 105 abutting on opposite ends with the base of the counterbore and face of the plunger, thereby providing a compressible connection between the spindle and piston 104. The outer end of the plunger 103 provides a shoulder between itself and the piston rod proper and surrounding the said piston rod is a collar 106 secured to the spindle 98 whereby movement of the piston rod to the right as seen in Figure 12 will through the interengagement of the shoulder and collar cause a corresponding movement of the spindle 98.

In order to effect the movement of the spindle, the piston rod 104 extends into a cylinder 107 secured to the tailstock housing 96. Inclosed within the cylinder 107 and secured to the rod 104 is a piston 108, reciprocation of which correspondingly reciprocates the piston rod and spindle.

The head and tailstock pistons 86 and 108 are adapted to be simultaneously shifted in opposite directions by an hydraulic medium which is valve controlled for alternately connecting the medium to the opposite ends of said pistons. As seen in Figure 19 there is provided a branch pressure conduit or medium 109 connected by a conduit 110 with the reversing valve casing 111 that alternately directs the medium to opposite ends of the cylinders. The casing 111 is provided with ports 112, 113, 114, 115 and 116, and it is with the port 114 that the conduit 110 is connected. The port 113 is connected by a conduit or pipe 117 with the conduit or pipe 118 that has its termini connected with the forward ends of the cylinders 85 and 107. The port 115 is connected by a conduit 119 with a port or conduit 120 that has its termini connected with the rear ends of said cylinders 85 and 107. The ports 112 and 116 are respectively connected with branch discharge conduits 121 and 122 connected to the tank or sump 37 for returning the exhaust medium thereto.

In order to connect the ports 114 with ports 113 or 115 and the remaining port with ports 112 and 111 the casing contains a valve 123 having spooled ports 124, 125 and 126 forming cannelures 127 and 128. The valve 123 is power shifted to its operative positions by means of solenoids 129 and 130 respectively connected with the left and right hand ends thereof as seen in Figure 19. The said solenoids are included in a control circuit as will be described later.

The raw material or unfinished work supply is disposed at the right hand end of the manufacturing line as shown in Figure 1A. By reference to Figure 9 it will be noted that this station comprises a table 131 having an inclined top 132 at the end of which is a stop 133 adapted to engage with the center of the work and leave the ends free for a purpose that will later appear. The table is provided with a mechanism whereby but a single work piece is permitted to lie near the stop 133 holding the remaining pieces at a distance spaced therefrom. This mechanism comprises a T-shaped lever 134, one arm of which 135 is cam shaped to engage the foremost work piece of the ones disposed remote from the stop 133. The other arm 136 of the lever is provided with a weight 137. A stem 138 extends forwardly from the arms 135 and 136 and is provided with a lug portion 139 adapted to be engaged with the separated work piece. The T-shaped lever 134 is pivoted at 140 and is adapted to be oscillated in one direction about the pivot 140 by the weight 137 and in the other direction by the separated work piece 141. By this construction and since the weight 137 times its lever is less than the weight of the work 141 times its lever, the parts are normally in the position shown in Figure 9 with the catch dog 135 in position to restrain the remaining work pieces. However, when the work piece 141 is raised or removed from the table 132, thereby releasing the stem 138, the weight 137 actuates the lever to withdraw the catch dog 135 and thereby release the remaining work pieces.

In order to insure that but a single work piece is released, there is provided a supplementary catch mechanism. This mechanism comprises the lever 142 having its one arm provided with a pin and slot connection 143 with the T-shaped lever 134. The said lever 142 has its other end arranged to form a stop catch 144 adapted to be inserted in the space between the foremost and next piece of the separated pieces. From this it will be seen that as the weight 137 oscillates the lever 134 in a clockwise direction to remove the stop dog 135 the lever 142 is oscillated in a counter-clockwise direction through the pin and slot mechanism for inserting the stop latch in the way of the remaining work pieces. However, as soon as the released piece reaches the lower end of the table 132 it engages with the lug 139 thereby operating the lever 134 in a counter-clockwise direction and shifting the stop dog 135 into position for engagement with the next piece. This movement of the parts operates the lever 142 in a clockwise direction and removes the stop latch 144 from operation and permits the work pieces to roll into engagement with the stop dog 135.

As was noted above, this invention includes a transfer mechanism for transferring the work pieces from the raw material supply or table 131 to the machines as well as shifting the work from machine to machine and from the last machine to a storage rack or the like. The mechanisms for accomplishing these results are identical in all respects and it is deemed sufficient if but one of them be described in detail. Accordingly, there is provided a track 145 disposed slightly at an angle to the manufacturing line whereby one end of the track is disposed in front of the machine while the other is disposed above the machine in substantial alignment with the work supporting portion thereof. This track is provided on its upper and lower surfaces with V-shaped guide surfaces 146 and 147, see Figure 5. The track itself is spacedly secured to posts 148 which constitute a frame for the track. It is to be understood that this track may be alternately secured to the ceiling, joists, or other structural parts of the building. In order to take care of different heights of work supports on different machines and maintain the same travel of elevator bar (to be described) the posts 148 may be of different lengths thereby slightly inclining the track 145. Mounted on each track is the work carrying and transferring mechanism which includes work pick-up fingers, elevating and lowering mechanism, and electrical or other controlling members.

The said carrying mechanism comprises a housing 149 which has secured to its rear surface grooved pulleys or wheels 150 and 151 respectively engaging the track guideways 146 and 147. Disposed centrally through the housing 149 is a way through which is axially shifted the elevator bar 152. Flanking the said way and interiorly of the housing 149 are grooved pulleys 153, 154 and 155 adapted to engage the V-shaped guides 156 and 157 formed along the longitudinal edges of the elevator bar 152. The pulleys or wheels 153 and 154 are loosely mounted on axles or shafts 158 carried by the housing 149, while the wheel 155 is loosely journaled on a stud 159 carried by one end of an arm 160 in turn pivoted to a shaft 161 carried by the housing 149. The arm 160 has secured to it one end of a spring 162, the other end of which is secured at 163 to the housing interiorly thereof. By reference to Figure 5 it will be noted that the spring 162 urges the wheel 155 toward the carrier bar 152 for holding it all times in contact with the wheels 154 and 153 so that the said bar is guided during its movements.

The lower end of the bar 152 has secured to it a lug 164 which overlies a carriage rail 165. The rail 165 has projecting from it a pivot shaft 166 which extends beyond the boss 164 to receive a lever 167, the purpose of which will be described in detail subsequently. The carriage rail 165 is provided on its under surface with a dove-tailed guide tongue 168 received in correspondingly shaped guideways 169 formed in the work carriage units 170 which are two in number, as seen in Figure 2.

Since each of the carriage units are identical in construction, it is deemed sufficient if but one of them be described in detail. Accordingly, the carriage comprises a bracket member 171 in which is formed the dove-tailed guide 169. The lower end of the bracket is provided with a work jaw here shown as a shoe 172 from which extends a threaded shank 173 extending through a threaded perforation in the lower end of arm 174, a lock nut 175 being provided to lock the jaw in adjusted position. Intermediate the ends of the bracket 170 it has projecting therefrom a second arm 176 having formed intermediate its ends a perforation 177 through which extends a second or movable jaw 178. This jaw 178 is shown in the form of a lever pivoted intermediate its ends at 179 where it passes through the perforation 177. The lower end thereof is provided with a shoe 180 which is V-shaped in cross-section so that a portion thereof may underlie the work when caught between itself and the opposed jaw shoe 172. The upper end of the jaw 178 is pinned or otherwise secured to an axially shiftable rod 181 on the outer end of which is secured the movable core 182 of a solenoid mechanism. The coil 183 of the solenoid being formed within or secured to an extension 184 of the bracket arm 176. On the extreme outer end the slide rod 181 is provided with a head 185 which limits the movement thereof under the influence of the solenoid mechanism. The rod 181 on its other end passes through a perforation 186 formed in the carriage bracket 170 which also acts as a guide for the movement of the said rod. Surrounding the bar 181 and disposed intermediate the upper end of the arm 178 and the carriage bracket 170 is a coiled spring 187 of the expansion type which is utilized for shifting the said arm in a direction opposite to that in which it was shifted by the solenoid mechanism. In other words, and as seen in Figure 5, the spring 187 actuates the jaw 178 toward the head 172 for engaging a work piece while the solenoid mechanism shifts these parts in the opposite direction to release the said work piece. There should also be noted at this time that the arm 176 has secured to it on its under surface, a switch casing 188 from which projects the switch pin 189 that is connected with the jaw for movement to operate the switch mechanism in the casing 188. The particular function of this switch mechanism will be described in detail subsequently.

It is sometimes necessary or desirable that the work be turned end for end between the different machines. It is also necessary that the work be maintained in a definite relationship with respect to the machine and the line of travel so that there is no jingling or shifting of the work during movement. For these reasons the lever 167 above referred to is employed and it carries at its outer end a roller 190, see Figure 17. This roller is disposed in a guideway 191 formed in the under face of the track 145. In the event it is desired to turn the work, such for example as when turning it end for end, the guide track and its guideway are provided with angles such as 192 and 193. From Figure 17 it will be noted that if the parts were traveling toward the left, the roller 190 would enter the angle 192 thereby tending to rotate the arm and pivot shaft 166 in a counter-clockwise direction about the axis of said pivot shaft. By the time the roller reaches the upper end of the said angle 192 the work is rotated through 90° or is disposed at right angles to its path of movement. As soon as the said roller reaches the apex of the angle it is momentarily held while the work carriage continues on thereby completing the rotation of oscillation of these parts so that when the said roller reaches the lower end of the angle 193 the work is again aligned for presentation to the machine, but this time the ends are reversed.

The elevator bar is axially shifted and consequently the work carriage and work by means of a rack bar 194 secured to one side of the elevating bar and meshing with a rack gear 195. The rack gear 195 is keyed or otherwise secured to a short shaft 196 rotatably mounted in the housing 149. The shaft 196 projects beyond the lateral sides of the housing and to each projecting end there is secured one member 197 and 198 of a pair of universal joints. The other members 199 and 200 of said joints are respectively secured to shafts 201 and 202 which extend to the duplicate transfer mechanisms associated with the machines ahead of and behind it. By this construction all of the elevator mechanisms are simultaneously operated and this is true regardless of the position of the elevators with respect to one another at the time they are actuated.

It is contemplated that these mechanisms will be power actuated for which reason, see Figure 1A, one end of the shaft 196 in the first mechanism instead of having the universal joint 197—199 secured thereto will carry a gear or chain sprocket 203. This chain sprocket being connected by a silent chain 204 with a similar sprocket 205 fixed to the shaft 206 of motor or prime mover 207. The motor 207 may be mounted in any convenient position with respect to these parts, but in view of the traversing of the units from machine to machine, it is deemed advisable if the motor were carried by the first unit for movement therewith. For this purpose the said unit is provided with a platform or motor support 208 thereby at all times insuring the proper and efficient operation of the parts.

In order to effect the traversing movement of each of the units they are respectively provided with an upstanding arm 209, see Figure 3. The arms 209 are pivoted at 210 to the carrier housing 149 so that any slight mis-alignment of the parts may be readily taken care of. The upper ends of the arms 209 are elongated as at 211, having formed therethrough an elongated perforation 212 through which passes a cable or the like, 213. The cable 213 has secured to it on each side of the arms 209, collars 214 and 215 which engage with the arms so that movement of the cable in either direction correspondingly and simultaneously effects the movement of the various carriers. The cable is substantially endless, passing about the grooved pulley 216 shown at the left hand end of Figure 1, and the pulley 217 shown at the right hand end of Figure 1A. The pulley 216 is secured to a shaft 218 rotatably journaled in the bracket 219 which may be suspended from the ceiling or supported by a support extending upwardly from the floor. The pulley 217 is likewise secured to a shaft 220 rotatably mounted in a bracket 221 again suspended from the ceiling or supported by the floor. The shaft 220 is provided intermediate its bearings with a sprocket 222 about which is trained a gear chain 223 which is in turn trained about the sprocket 224, see Figure 10. The sprocket 224 is keyed or otherwise secured to the motor shaft 225 of a prime mover 226. From this it will be seen that the cable 213 is adapted to be power actuated and since the motor 226 is of the reversible type the work transfer mechanism will be actuated in opposite directions.

In order to maintain the proper driving tension in the cable 213 it passes intermediate its ends over a plurality of idler pulleys here shown as three in number and being indicated by the reference numerals 227, 228 and 229. Pulleys 227 and 229 are loosely journaled respectively on studs 230 and 231 carried by plate member 232. The intermediate pulley 228 is loosely journaled on a stud 233 mounted on a slide 234 slidable relative to the plate 232. A tensioning screw 235 is provided for shifting the plate and thereby establishing the tension in the cable 213. Clamp bolts 236 are employed for securing the plate in adjusted position after the proper tension has been established.

The work is received at each machine from the transfer mechanism by a pair of work supports 237 and 238 which are identical in construction and operation and illustrated in Figures 4, 6, 7 and 16 in detail, and it is deemed sufficient if but one of them be described in detail. Accordingly, the work support 237 comprises a housing member 239 provided with an angled seat 240 adapted to engage with the correspondingly shaped upper surface of the work table 26. At its inner end the housing 239 is formed with a V-shaped block 241 into which the work is deposited by the transfer mechanism and the said block supports the work in axial position with respect to the head and tailstock centers from which it is picked up thereby. At the conclusion of the machining operation the work is again deposited by the centers in the V-block and is subsequently raised therefrom and transported to the rear end of the housing 239 from which it is transferred to the next machine.

The mechanism for effecting the shifting of the work from the inner to the outer end of the housings comprises a guiding tongue or rib 242 projecting from the housing 239. This tongue 242 is received in a guideway 243 formed axially along one face of a rack plate 244. The rack plate 244 has pivoted to it near its one end at 245 a cradle 246. The cradle 246 has attached to its end one end of a spring 247 anchored to the side of the rack 244. The spring 247 maintains the cradle in a position for holding the work and causing it to move with the rack when so actuated. The cradle has a second position shown in Figure 6 at which time it is below the work and is in this position when moving from the outer to the inner end of the housing 239 as when approaching the position to pick up the work piece being operated upon at that time. In order to hold the cradle in this second position against the resistance of the spring 247 it is provided on its forward end with a lug 248 co-operating with the nose 249 of latch 250. The latch 250 is pivoted to the rack plate 244 and spring actuated toward the cradle 246 by means of the spring 251 carried by the rack plate 244 near its inner end. In order to release the latch 250 at the proper time the housing 239 is provided with a release block 252 in the line of movement of the rack plate 244 and adapted to engage the tail of the latch 250. The cradle 246 is actuated to its lower or second position by means of a cam lug or dog 253 pivotally mounted on angle bracket 254 carried by the housing 239. The cam lug 253 is backed on one side by a stop 255 so that it will operate to oscillate the cradle 246 only when it is moving in a given direction; namely, from the outer to the inner end of the bracket 239 but will be ineffective thereon when moving from the inner to the outer end thereof. In addition, the rack plate 244 is provided with a T-shaped slot in which is mounted a switch dog 256 for closing the limit switch 257 carried by the housing 239 near the outer end thereof. The switch 257 is part of the electrical control circuit to be later described.

In order to simultaneously actuate the rack plates 244 of each of the work supporting mechanisms 237 and 238, they have jointly journaled therein a spline shaft 258 which extends along the forward face of the machine. Keyed to the spline shaft for rotation therewith are rack gears, one for each of the work supporting mechanism and indicated in Figure 7 by the numeral 259. The gear 259 is flanked on its one side by the housing 239 and on its other side by a plate 260 which defines the plane of movement of the gear and insures its alignment at all times with the rack plate 244. The spline shaft 258 is journaled on its other end in bearings provided by a bracket 261 secured to the left hand end of the bed as shown in Figure 2. Secured to the shaft 258 near the bracket 261 is a rack pinion 262 meshing with a rack 263 secured to one end of a piston rod 264. The piston rod 264 has its other end disposed within a cylinder 265 forming part of the bracket 261 and the said rod carries within the cylinder a piston 266. The piston 266 is adapted to be actuated by the hydraulic medium under pressure for effecting the in and out movement of the work cradle 246 depending upon in which direction the piston is actuated.

The mechanism for effecting and controlling the operation of the piston 266 is shown in Figure 19 and includes the branch pressure line or conduit 109 that terminates in valve casing 267 which has formed therethrough ports 268, 269, 270, 271 and 272. It is with the port 270 that the branch pressure line 109 connects while the port 269 has connected therewith one terminus of a pipe or conduit 273 that terminates in a port in the lower end of the cylinder 265. Connected with the port 271 is one terminus of a pipe or conduit 274 having its other terminus connected with the upper end of the cylinder 265. Ports 268 and 272 are respectively connected by branch discharge conduits 275 and 276 that terminate in the sump or tank 37.

Disposed within the bore of the valve casing 267 for axial movement relative thereto is a spool type valve 277 having piston portions 278, 279 and 280 forming cannelures 281 and 282, whereby the ports through the casings are connected in different combinations. The valve 277 is adapted to be cyclically actuated by power means for which reason it has connected to opposite ends thereof solenoids 283 and 284 which are a part of the electrical circuit to be subsequently described. From the foregoing it will be noted that the work piece at the conclusion of its operation is actuated to the rear end of the work supports where it is picked up by the transfer mechanism for delivery to the next machine or to the finished work pile.

As was above noted, it is necessary that the size of the work be automatically controlled and it is the sizing device which to a large extent forms the heart of an automatic transfer system and determines when the parts are to function since different operations on different work pieces will take a different interval of time to complete. In order, however, that the transfer mechanism and the several units thereof operate in an efficient manner, it is the discharge of the work that controls its function, the automatic size control being resorted to for controlling the operation of its particular machine. Accordingly, there is shown in Figure 8 one form of sizing device though it will be understood other types may be employed with equal facility. The sizing device shown in Figure 8 comprises a housing 285 mounted on the angled face of the work table. Mounted in the housing is a shaft 286 that projects beyond one face thereof and carries a contact finger 287 adapted to ride on the work as it is being tooled. The finger 287 is yieldably actuated to rotate in a clockwise direction which movement is resisted until the work is to the desired size whereupon the finger snaps by the work. In order to effect the said movement of the finger, it has keyed to its shaft a pinion 288 meshing with a gear 289 loosely journaled on a second shaft 290 carried by the walls of the housing 285. The gear 289 is in mesh with a rack 291 axially shiftable through a bore 292 formed within the housing 285. Behind the rack 291 is a spring 293 abutting therewith and with a plug 294 closing the end of the bore 292. As seen in Figure 8 the spring 293 tends to shift the rack toward the right which through the gears, and as above described, tends to rotate the gaging or contacting finger 287 in a clockwise direction. Extending through the rack centrally thereof is an electrical conduit or wire 295 which terminates on its inner end with a switch contact 296. The switch contact 296 is in line with a second switch contact 297 carried by insulation member 287 which closes the inner end of the bore 292. Extending from the switch contact 297 is an electrical conduit or wire 299. The wires 295 and 299 form part of an electrical hydro-control circuit which will be later described in detail.

In order to reset the sizing device and elevate the contact finger 287 prior to the operation on a subsequent work piece, the rack 291 is adapted to be shifted against the resistance of spring 293. For this purpose the rack has projecting from one side thereof a pin 300 adapted to be engaged by an arm 301 of a bell crank 302 pivoted at 303 to the side of the housing 285. The bell crank 302 is actuated in a counter-clockwise direction by a spring 304 which has one end connected with the arm 301 and its other end anchored to the housing 285. It will be appreciated that this mechanism must come into play only when the machine is idle and prior to the placement of a rough or unfinished work piece on the work support. This mechanism may be operated in any desirable manner but as shown in the drawings comprises an arm 305 having on its upper end a cam face 306. The arm 305 is secured to the tool carriage 27 so that it moves therewith both toward and from the work. Its cam face 306 is adapted to engage a roller 307 carried by the outer end of the second arm 308 of the bell crank 302.

The operation of this mechanism is as follows: the sizing finger is constantly urged to move in a clockwise direction with the parts in the position as shown in Figure 8. This is as above described. After the work has been reduced to the desired size the tool carriage 27 is retracted, thereby carrying with it the arm 305 and releasing through its cam face 306 the roller 307. At this time the spring 304, which is stronger than the spring 293, oscillates the bell crank 302 in a counter-clockwise direction causing through its arm 301 and the pin 300 a shifting of the rack 291 to the left, and through the transmission to the contact finger 287 an elevation thereof. The parts are now in position to receive a rough or unfinished work piece since the finished one is removed from the machine. When it is desired to operate on the rough piece now in the machine, the carriage is again actuated toward the work, carrying with it the arm 305. The relation of the parts is such that the arm 305 through its cam face 306 operates the bell crank against the resistance of the spring 304 thereby permitting the rack 291 to be yieldably shifted to the right for again lowering the contact finger into engagement with the work, whereupon the parts operate as above described.

The electrical circuit and the interlocking of the parts is illustrated in Figure 19 which will now be described in detail. The main current source or leads is indicated by the numerals 310 and 311 which respectively indicate the plus and minus lines of the circuit. The individual switches 257 operated by the work carriage when retracted to its final position are connected in series, thereby insuring that all of the work pieces are completely finished and completely retracted from the operative position relative to the machine before the transfer mechanisms are operated. These switches are indicated in Figure 19 by the reference numerals 257', 257", and 257'''. An electrical wire 312 extends from the negative lead 311 and is connected with the limit switch 257' by a wire 313. The switches 257' and 257" are connected by the wire 314, while the switches 257" and switch 257''' are connected by the wire 315. Extending from the switch 257''' is a wire 316 connected with one end of a wire 317 which terminates at the solenoid 318 for reversing switch 319, which controls the direction of rotation of the elevating motor 207. The other side of the solenoid 318 is connected by a wire 320 with the positive main lead 310.

From the foregoing it will be noted that in order to complete the electrical circuit just described it is necessary that all of the limit switches 257 be closed. It should be noted at this time that the wire 313 connecting the wire 312 and limit switch 257 is provided therein with a solenoid switch 321 which may be closed by a spring 322 so that when the said switches 257 are closed the solenoid 318 will be energized. The solenoid switch 321 includes a coil having one end connected by a wire 323 with the wire 312 from the negative lead 311 and has its other side connected by a wire 324 with one side of a switch 325 which is spring operated to an open position and positively actuated to a closed position. The mechanism for closing this switch will be described in detail subsequently. The other side of the switch 325 is connected by a branch wire 326 with a wire 327 that terminates in the positive lead 310. With the parts in the position shown in Figure 19, it will be noted that the switch 325 is open, thereby de-energizing the solenoid switch 321 so that it will be closed for completing the electrical circuit to the solenoid 318 upon the proper operation of the limit switches 257.

The elevating motor reversing switch 319 diagrammatically includes contact arms 328, 329, 330 and 331 of which the arms 328 and 331 are electrically connected by a lead 332, in turn connected by a wire 333 with the negative main lead 311, while the contact arms 329 and 330 are electrically connected by a wire 334 in turn connected by a wire 335 with a positive lead 310. Upon energization of the solenoid 318 the arms 328 and 329 are brought into engagement with contacts 336 and 337, which are respectively connected by electric wires 338 and 339 with a normally closed switch 340 and one brush 341 of the elevating motor 207. The other side of the switch 340 is connected by a wire 342 and wire 343 with the second brush 344 of the elevating motor 207. For descriptive purposes it is presumed that the current is now flowing through the motor 207 in a direction for rotating same in a counter-clockwise direction to lower the various elevating arms to a position for depositing the work in operative relation with the machine tools.

Mounted on the elevator bar 152 is a plurality of dogs or cams which will now be described in the order in which they operate various switches, also the switches operated thereby will be described in detail. Accordingly, the elevator bar 152 has secured to it intermediate its length so as to operate at about the mid-position of the elevator bar stroke a cam 345, having formed on each end thereof a cam face 346 and 347. These cam faces operate a switch mechanism shown diagrammatically in Figure 19 and structurally in Figures 18, 20 and 21. As shown in these figures, the switch mechanism comprises a housing member 348 having journaled therein a shaft 349. Loosely journaled on the shaft is a gear 350 in mesh with the teeth of a rack bar 351, slidably mounted in bearings 352 carried by housing 348 for transverse movement relative thereto. The rack bar 351 is actuated in one direction, namely, toward the elevator bar 152 by means of a spring 353 which surrounds said bar and abuts on one end against the housing and on the other end against a collar 354 carried by the bar. The bar 351 is operated in the other direction or away from the elevator bar 152 by the cam faces 346 and 347. The gear 350 has secured to one face thereof a pawl 355 adapted to engage with successive teeth on a ratchet member 356 secured to the shaft 349 adjacent to the gear. The parts are so arranged and the amount of shifting of the rack bar 351 is such that each reciprocation of the rack bar rotates the shaft 349 a quarter turn in a given direction.

Secured to the shaft 349 is a pair of cam discs 357 and 358, the former of which has a single cam lobe 359, while the latter is circular, being provided with a cam notch 360. The cam 357 is adapted by its lobe 359 to momentarily close once for each revolution thereof a switch 361. The cam plate 358 is adapted to actuate the switch 325, above referred to, as well as a switch 362. By reference to Figure 18 it will be noted that the switches 325 and 362 are carried by the housing 348 in position to be substantially diametrically opposed to one another. It will also be noted that during the major portion of the time, the switches 325 and 362 are closed, being opened only when the cam 358 is occupying one of its four positions.

In order to hold the shaft 349 in each of its four positions it has secured to it a second ratchet plate 363 co-operating with a spring pressed detent 364 carried by the housing 348. From the foregoing it will be noted that the shaft is actuated a quarter of a revolution for each vertical reciprocation of the elevator bar 152 and retained in this position. Since a complete cycle of operation of the parts include the lowering and raising of the bar twice, it will be seen that the parts are returned to a given position prior to the commencement of the cycle.

For the purposes of describing the operation of this invention it is assumed that the cycle commences with the bar above the machine in which the work is to be disposed and must be lowered to place the work carried thereby in operative position with relation to the work supporting parts.

Carried by the elevator bar near the upper end thereof is a pivoted dog 365 held in its normal position by a spring 366 whereby the dog is operative in one direction but inoperative in the reverse direction. The dog 365 is adapted to operate a switch mechanism illustrated diagrammatically in Figure 19 and structurally in Figures 13 to 15 inclusive. As there shown, this switch mechanism comprises a housing secured to the carrier mechanism 149. Rotatably mounted in the switch housing 367 is a shaft 368 carrying exteriorly of the housing a star wheel or ratchet 369 adapted to be engaged by the dog 365 for effecting a quarter revolution of the shaft upon each descent of the elevator bar 152. Secured to the shaft 368 interiorly of the housing 367 is a cam plate 370, having formed thereon lobes 371 and 372 which are diametrically opposed to one another for alternately closing the switch 373. For holding the shaft in each position against inadvertent operation the shaft may be provided intermediate its ends with notches 374 co-operating with a spring pressed detent 375 carried by the housing 367. From the foregoing it will be noted that the switch 373 is alternately opened and closed for purposes to be later described.

Secured to the elevator bar 152 in spaced relation with respect to the dog 365 is a cam 376 adapted to operate a double switch including the switch 340 and a second switch 377. The housing 378 for this double switch may be conveniently secured to the upper surface of the switch housing 367 above described and these parts are so related that the dog 365 and cam 376 substantially, simultaneously actuate their switches.

Continuing now the description and operation of the electrical circuit of Figure 19, it will be remembered that the elevator bar is descending. Substantially midway of its descent the cam 345 through its cam face 347 actuates the cam discs 357 and 358. Prior to this operation the parts are in the relation shown in Figure 19 with the switch 325 opposed to the notch 360 and therefore open, and with the switch 362 riding on the periphery of this cam plate and therefore closed. At the same time, lug 359 of the disc 357 has already passed the switch 361. Therefore upon actuation of the discs 357 and 358 the notch will be actuated beyond the switch 325 and the periphery of this disc will pick up the same, thereby closing the switch and energizing the solenoid switch 321 and breaking the electrical circuit to the series switches 257. The breaking of this circuit de-energizes the solenoid 318 for the reversing switch 319. Since the lug 359 of the cam disc 357 had already passed the switch 361, further movement thereof away from the switch will of course in no wise change its position.

As the elevator bar nears the lower limit of its movement the dog 365 operates its switch mechanism for closing the switch 373. The closing of the switch completes an electrical circuit, including the following: Extending from the positive main lead 310 is a wire 379, which terminates at one contact of the switch 373, and extending from the other contact of this switch is a wire 380 connected with one end of the coil 183 of the work finger operating solenoid. The other side of the coil 183 is connected by the wire 312 with the negative lead 311.

The completion of the electrical circuit just described effects the operation of the work finger 178 to release the work piece being carried by the elevator bar. Since the elevator bar is now in substantially its lowermost position the work is deposited in operative relation with the tool. As was above noted, this operation of the work finger is against the yielding resistance of the spring 187.

Substantially at the same time that the work piece is released, the cam 376 operates the double switch 340—377, breaking the former and making the latter. As was above described, the switch 340 is in the elevator motor circuit for rotating the motor in a downward direction. Therefore, the breaking of the switch will break the motor circuit and cause a stopping in the rotation thereof.

The making of the switch 377 completes an electrical circuit as follows: Extending from the positive wire 379 is a wire 381, terminating in one contact of the switch 377, and extending from the other contact of this switch is a wire 382 that terminates in one end of a solenoid 383. The other side of the solenoid 383 is connected by a wire 384 with the negative main lead 311. The energization of the solenoid 383 reverses the elevating motor switch 319 and shifts same to the position shown in Figure 19 for effecting a rotation of the elevating motor in a direction to raise or elevate the elevator bar 152 now free of any work piece.

The electrical circuit through the motor 207 now is as follows: The contact arm 331 connected by the wire 333 with the negative lead 311 engages with the contact 385 connected by a wire 386 with the wire 339 and brush 341. At the same time the contact arm 330 from the positive main lead 310 connects with the contact 387 connected by a wire 388 with one contact of switch 389 at this time closed and not opened as illustrated in Figure 19. The other side of the switch 389 is connected by a wire 390 with the wire 342 and brush 344. From this, it will be seen that the current is now flowing through the motor in the opposite direction thereby effecting a reverse rotation thereof and an elevation of the elevator bar 152.

The upward movement of the elevator bar 152 through the cam 345 rotates the cam discs 357 and 358 through the second quarter of a revolution movement. The rotation of the disc 357 merely advances the lobe 359 without effecting the operation of its switch, while the movement of the cam 358 brings the notch 360 in line with the switch 362 whereupon it is opened for breaking the circuit to the solenoid switch 430 so that upon completion of the circuit which includes this switch, as will later be described, the proper operation of the mechanism is had. The circuit, including the switch 362, includes a wire 433 from one contact thereof connected by a wire 444 with the main positive lead 310. The other side of the switch 362 is connected by a wire 445 with one end of the solenoid coil 446, while the other end of this coil is connected by a wire 332 that terminates at the negative main lead 311.

Secured to the elevator bar 152 so as to operate additional switches are a pivoted dog 391 and cam plate 392. The dog 391 is mounted in the same manner as the dog 365 and operates a switch mechanism identical with that operated by the dog 365. This switch mechanism has been illustrated only in the diagrammatic view of Figure 19 and comprises a star wheel or ratchet 393 which is similar to the star wheel or ratchet 369. The star wheel 393 is connected to a shaft 394 carrying a cam plate or switch actuator 395 similar in all respects to the cam plate 370 and adapted to alternately close and break a switch 396 by the alternate ascent of the elevator bar 152.

The dog 391 is adapted to actuate its switch mechanism shortly after the elevator bar starts upwardly for closing the switch 396. The closing of the switch 396 completes the following electrical circuit: Extending from the positive lead 310 is a wire 397, that terminates in one contact of the switch 396, and extending from the other contact of this switch is a wire 398 that terminates in one end of the solenoid 129. The other side of the solenoid 129 is connected by a wire 399 with a wire 400 terminating in the negative main lead 311. As was above pointed out, the solenoid 129 operates the center reversing valve so that substantially as soon as the work is placed in position, the machines are again set in motion for operation thereon. From the foregoing, it will be noted that the only idle time of the machine was that required to cause the descent of the work from the elevated position to a position in operative relation with the work support and a reversal of the carrier bar which takes place substantially as soon as the work is released. It should, therefore, be evident that the idle time of the machine is reduced to a minimum.

The elevator bar 152 has of course been constantly ascending and when it reaches its uppermost position, the cam 392 operates a double switch, including the switch 389 and a second switch 401. The double switch 389—401 is similar in all respects to the double switch 340—377 operated by the cam 376. The opening of the switch 389 breaks the electrical circuit to the motor 207, thereby stopping its rotation with the bar in its uppermost position.

The simultaneous closing of the switch 401 completes an electrical circuit as follows: Extending from the positive main lead 310 is a wire 402 connected with one contact of the switch 401, and extending from the other contact of this switch is a wire 403, which terminates at switch 404 of a double switch mechanism, including a second switch 405 and included in the switch casing 188 secured to the movable arm bracket 176 as above described. It should be noted that upon actuation of the work finger 178 the switch 404 was closed through the actuation of the switch pin 189, so that the closing of the switch 401 now completes the electrical circuit from the switch 404. Extending from the second contact of the switch 404 is a wire 406, terminating at one end of a solenoid 407 which operates the reversing switch 408 for the traverse motor 226. The other side of the solenoid 407 is connected by a wire 409 with a main lead 311.

The reversing switch 408, similar to the reversing switch 319, includes contact arms 410, 411, 412 and 413, of which arms 411 and 412 are electrically connected by a wire 414, in turn connected by a wire 415 with the positive main lead 310, and the arms 410 and 413 are electrically connected by a wire 416, in turn electrically connected by a wire 417 with the negative main lead 311. The energization of the solenoid 407 causes the contact arm 412 to engage with reversing switch contact 418 connected by a wire 419 with one brush 420 of the motor 226. At the same time the contact arm 413 engages with reversing switch contact 421 connected by a wire 422, which terminates in a switch 423, at this time closed and yieldably held so. The other side of the switch 423 is connected by a wire 424 with the second brush 425 of the motor 226. It is now assumed that the current is flowing through the motor in a direction to traverse the transfer mechanism from one machine to the machine behind it, or from the first machine to the raw material supply and from the finished product stack to the last machine in the line, to a position for picking up the work pieces finished by the machine and held in position by the work ejecting mechanism above described. The traverse of the transfer mechanism will continue until the switch 423 is opened. This switch is operated by one side of an arm 426, which projects upwardly from the carrier housing 149. It will be understood that the breaking of the switch 423 interrupts the motor circuit, thereby effecting its stopping.

The switch 423 is part of a double switch, including the second switch 427, which is simultaneously made with the breaking of the switch 423. One side of the switch 427 is electrically connected by a wire 428 with the negative main lead 311, while the other side of this switch is electrically connected by a wire 429 with a solenoid operated switch 430. The other side of the solenoid operated switch 430 is connected by a wire 431 with the wire 317 for the elevating motor reversing switch solenoid 318. From this, it will be seen that as soon as the work carrier or transfer mechanisms have been actuated to the position for picking up the previously finished work the elevating motor is energized for causing a descent of the carrier bar 152 to the position to engage the work.

The descent of the bar at this time operates through the cam 345 for again shifting the cam discs 357 and 358 through their third quarter of a revolution. This movement of the discs closes the switch 362 for energizing the solenoid switch 430 and breaking that electrical circuit. At the same time, the disc 358 is positioned so that its next movement will cause the closing of the switch 361. The continued movement of the bar 152 next brings into play the dog 365 and cam 376, the cam 376 at this time merely breaking the motor circuit, as above described, for stopping the downward movement of the bar. Just prior, however, to the stopping of the motor, the dog 365 engages the star wheel 369 and actuates the switch cam or actuator 370 for again opening the switch 373. The opening of this switch de-energizes the solenoid 183 so that the spring 187 may actuate the movable work finger 178 toward the fixed work finger and engage there between the work piece. The operation of the work finger 178 through the switch pin 189, secured thereto, opens switch 404 and closes the switch 405 within the casing 188. With the switch 405 now closed and upon completion of the switch 377 by the cam 376, the following circuit is completed.

The closing of the switch 377 completes the electrical circuit as above described to the solenoid 383, thereby again shifting the reversing switch 319 to the position to effect a rotation of the motor 207 for elevating the bar 152. During the ascent of the bar 152 at this time the cam 345 shifts the rack bar 351 for actuating the cam and discs 357 and 358 through the final quarter turn of their complete revolution. During this said final quarter turn the lug 359 on the disc 358 now closes switch 362 and completes the following electrical circuit. One side of the switch 361 is connected by a wire 432 with the wire 327 from the main positive lead 310. The other side of the switch 361 is connected by a wire 433 with one end of a solenoid 283, the other side of which solenoid is connected by wire 434 with the negative main lead 311. The energization of the solenoid 283 shifts the work carrier valve to a position to effect the inward movement of the work ejector or carrier to a position to pick up the work piece as soon as it is completed.

Continued upward movement of the carrier bar 152 through the dog 391 and star wheel 392 operates the switch actuator 395 to open the switch 396. The opening of this switch 396 de-energizes the solenoid 129 so that the center reversing valve may be actuated in a reverse direction subsequently, as will be described. Further movement of the carrier bar 152 causes the cam 392 to operate the double switch 389—401, thus stopping the rotation in an upward direction of the motor 207 and completing an electrical circuit through the switch 401. The circuit controlled by the switch 401 at this time is the same as the one above described down to the switch 404 of the double switch 404—405 on the work finger bracket. The circuit at this time is through the switch 405, which has its one side connected by a wire 435 with one end of a solenoid 436 associated with the traverse motor reversing switch 408. The other side of the solenoid 436 is connected by a wire 437 with the negative main lead 311.

The energization of the solenoid 436 shifts the reversing switch 408 in the opposite direction, or to the position shown in Figure 19. At this time the contact arm 411 connected with the positive main lead 310 through the wires 414 and 415 is brought into engagement with switch contact 438 connected by a wire 439 with one brush 425 of the motor 226. At the same time the contact arm 410 connected with the negative main lead 311 by wires 416 and 417 is brought into engagement with reversing switch contact 440, electrically connected by a wire 441 with one contact of a switch 442 at this time closed. The other side of this switch 442 is connected by a wire 443 with the wire 419 and motor brush 420. From this, it will be seen that the current through the motor is flowing in a reverse direction, thereby reversely translating the transfer mechanisms or advancing them to the point where they will be in a position for depositing the work on the machines which is the position originally assumed when describing the cycle of operation of the parts. When the transfer mechanisms reach the desired position the arm 426 on the carrier housing engages the switch 442 to open same and break the electrical circuit to the traverse motor 426 and stopping its rotation.

The parts of the transfer mechanism then remain in this position until all of the work pieces being operated upon are completed and the work ejecting mechanism or carriers fully retract to close the series limit switches 257', 257" and 257''', whereupon the transfer is again operated through the cycle just described.

As was noted above, substantially immediately after the work pieces have been deposited in operative relation with the machine the solenoid 129 is operated to shift the centers control valve, whereupon the said centers are actuated toward one another to pick up the work pieces. As was above described, the work is caught in a chuck and rotated thereby while being in alignment with the said centers. Each of the centers is adapted to respectively actuate a switch 448 and 449 which have one of their contacts connected by a wire 450. The second contact of the switch 449 is connected by a wire 451 with the main positive lead 310. The second contact of the switch 448 is connected by a wire 452 with a solenoid operated switch 453, the other side of which switch is connected by a wire with one end of solenoid 57, while the other end of the solenoid is connected by a wire 455 with the wire 400 terminating at the negative main lead 311. From the foregoing it will be seen that switches 448 and 449 are connected in series and complete the electrical circuit for actuating the tool carriage reversing valve. At this time the valve is positioned to cause an inward or feed movement of the tool carriage and thereby reduce the work to the desired size.

The solenoid switch 453, above referred to, includes a wire 456 connected by a wire 457 with one contact of the sizing device and one end of the coil 458 thereof. The other side of the coil is connected by a wire 459 in turn connected by a wire 460 with the wire 400 that terminates at the negative main lead 311.

As above indicated, the tool carriage is now advancing toward the work, which movement continues until the sizing device contacts engage one another, whereupon the following electrical circuits are completed. One contact of the sizing device is connected by a wire 461 with the wire 451 which extends from the positive lead 310, while the second contact is connected by a wire 457 with a wire 462, terminating at one end of the solenoid 58. The other end of the solenoid 58 is connected by a wire 463 with the wire 400, terminating at the negative lead 311. From this, it will be seen that the tool carriage is actuated toward the work until the work is reduced to the desired size whereupon the solenoid 58 is completed for reversely shifting the tool carriage control valve and effecting a rearward movement of the valve.

Prior, however, to the shifting of the valve and at the same time that the solenoid thereof was energized, the following electrical circuit was completed: From the sizing device contacts through the wires 457 and 456 to the coil 458 of the solenoid switch 453 and wires 459, 460 and 400 thereby breaking the electrical circuit to the solenoid 57 so that solenoid 58 may be operated. Associated with the solenoid switch 453 is a second switch 464 which completes an electrical circuit from the wire 452 through a magnet 465 to the wire 460. The purpose of this magnet is to provide a magnetic latch for holding the solenoid switch 453 in an open position until the centers have been retracted to release the work piece. If this mechanism were not provided and since the sizing device contacts are separated upon the retraction of the tool carriage, the electrical circuit through the solenoid 453 would be broken, thereby completing the circuit through the switch 453 and immediately reshifting the tool carriage valve to a feeding position. However, so long as the switches 448 and 449 remain closed, the magnet after once being energized will remain so until the break of the switches 449 and 448.

The tool carriage, upon being retracted, operates a switch 466 which has connected with one contact thereof a wire 467 connecting with the wire 451 and main positive lead 310. The other side of the switch 466 is connected by a wire 468 with one end of the solenoid 130, while the other end of this solenoid is connected by a wire 469 with the wire 400 terminating in the negative lead 311. From this, it will be seen that upon retraction of the tool slide the centers reversing valve is actuated to a position for retracting the said centers from the work and thereby effecting a release of the work from the chuck. The released work is immediately picked up by the ejecting mechanism for ejection to a point beyond the machine for subsequent transfer by the transferring mechanism.

Upon retraction of the work centers to their fully retracted position they operate respectively switches 470 and 471 connected in series as by a wire 472. The second contact of the switch 470 is connected by the wire 460 with the wire 400 and the negative main lead 311, while the second contact of the switch 471 is connected by a wire 472 with one end of the solenoid 284 associated with the ejecting mechanism reversing valve. The other side of this solenoid 284 is connected by the wire 444 with the positive lead 310. From this, it will be seen that as soon as the work piece has been released from the centers the work ejecting mechanism is set into operation for ejecting the work from the machine and, as pointed out above, at the end of this movement operates its limit switch 257. The machines then remain idle until all of the machines have completed their work pieces and all of the work pieces have been ejected from their respective machines and until a new or unfinished work piece is deposited in operative relation thereto, whereupon the machines are again actuated through the cycle just described.

The operation of the device in general may be briefly summarized as follows:

Assuming that each machine is operating on a piece of work and the elevator bars are each poised above its machine ready to deposit a new work piece therein, each machine as it finishes its piece of work or its operation on the work piece starts its ejector mechanism which carries the said work from the machine to a point outside thereof. At the conclusion of the operation of each ejecting mechanism it closes an electrical switch 257, the said switches of each machine being wired in series to one another. As soon as all of the switches 257 are closed an electrical circuit is completed, causing the operation of the conveyor mechanisms prime mover to start operating and effecting the descent of the carrier bars to position a fresh work piece in its machine.

After all of the work pieces have been deposited the movement of the bars is reversed to effect their upward movement. When the elevator bars are clear of the machines, but before the said bars reach their upper limits of movement, they individually initiate the automatic cycle of their machines, the bars then continuing until they reach their upper limit of movement. As soon as the said bars reach their said upper limits of movement a switch is closed for energizing the traversing motor which causes the said bars and the work carriages associated therewith to travel to the preceding machine or unfinished work stack, as is the case with the first transfer mechanism. When the said bars reach the preceding machine they are above the work piece previously ejected from said machine and then the bars are lowered to pick up the said work finished by that machine. The bars are then immediately reversed so far as their vertical movement is concerned, whereupon upon reaching their upper or raised position they are traversed to the succeeding machine and again poised above the machine's work support, except of course the last transfer mechanism which is now poised above the finished work stack.

The machines during the operation of the transfer mechanisms were of course operating upon their work pieces or effecting their individual operation on the said work piece. This operation, of course, continues until it is completed whereupon the work ejectors are again set in motion and effect a repetition of the cycle just described.

From the foregoing, it will now be evident that there has been provided a transfer mechanism for use in manufacturing lines in which the idle time of the machine has been reduced to an absolute minimum, since the transferring of the work pieces from machine to machine, from the unfinished stack to the first machine and from the last machine to the finished stack is accomplished substantially during the operation of the several machines. It will also be noted that by this construction the transferring mechanisms may be operated at a much slower, safer rate of speed than would be the case if it were attempted to effect the transfer of the work from machine to machine during the idle time of the machines.

What is claimed is:

1. In a mechanism of the class described the combination with a manufacturing line, including a plurality of machine tools, of an ejecting mechanism associated with each machine tool for ejecting the work therefrom upon completion thereof, a work support associated with each machine tool, a transfer mechanism operable between the work ejecting mechanism of one machine and the work support of the next machine for transferring the finished work from one machine to the next, means for turning the work end for end while being transferred from one machine to the next and while supported by the transfer mechanism, said transfer mechanisms each including an elevator bar, means for actuating the elevator bar of each transfer mechanism simultaneously, and means controlled by the ejector mechanism whereby each machine has had its work piece ejected prior to the operation of the transfer mechanism.

2. In a mechanism of the class described the combination with a manufacturing line including a plurality of adjacent machine tools, of automatic mechanism associated with each machine tool for effecting its cyclic operation to complete the operation of each machine on its work piece, an ejector mechanism associated with each machine tool for ejecting the work therefrom upon its completion, a plurality of transfer mechanisms, one for each machine and adapted to sequentially deposit a work piece in the machine and remove the ejected work piece to the preceding machine, and means operable by the transfer mechanism for initiating the cycle of its machine upon depositing a work piece thereon.

3. In a mechanism of the class described the combination with a manufacturing line including a plurality of adjacent machine tools, automatic means for cyclically operating said machines for producing a work piece thereby, an ejecting mechanism automatically operable by each machine for ejecting the finished work piece therefrom upon completion thereof, a transfer mechanism for each machine operable between adjacent machines for depositing a work piece on its machine and removing the work piece from the preceding machine, and interlocking control means operable by the ejector means upon completion and ejection of the work from each machine.

4. In a mechanism of the class described the combination with a manufacturing line including a plurality of adjacent machine tools, automatic means for cyclically operating said machines for producing a work piece thereby, an ejecting mechanism automatically operable by each machine for ejecting the finished work piece therefrom upon completion thereof, a transfer mechanism for each machine operable between adjacent machines for depositing a work piece on its machine and removing the work piece from the preceding machine, interlocking control means operable by the ejector means upon completion and ejection of the work from each machine, each ejector mechanism including an elevator bar for supporting the work during transfer from machine to machine and for depositing the work in its machine, and means operable by the ejector bar for initiating automatic operation of its machine after placing a work piece therein.

5. In a mechanism of the class described the combination with a manufacturing line including a plurality of adjacent machine tools, automatic means for cyclically operating said machines for producing a work piece thereby, an ejecting mechanism automatically operable by each machine for ejecting the finished work piece therefrom upon completion thereof, a transfer mechanism for each machine operable between adjacent machines for depositing a work piece on its machine and removing the work piece from the preceding machine, interlocking control means operable by the ejector means upon completion and ejection of the work from each machine, each ejector mechanism including an elevator bar for supporting the work during transfer from machine to machine and for depositing the work in its machine, means operable by the ejector bar for initiating automatic operation of its machine after placing a work piece therein, and means connecting the elevator bars whereby they are simultaneously operated and a single power source therefor.

6. In a mechanism of the class described the combination with a manufacturing line including a plurality of adjacent machine tools, automatic means for cyclically operating said machines for producing a work piece thereby, an ejecting mechanism automatically operable by each machine for ejecting the finished work piece therefrom upon completion thereof, a transfer mechanism for each machine operable between adjacent machines for depositing a work piece on its machine and removing the work piece from the preceding machine, interlocking control means operable by the ejector means upon completion and ejection of the work from each machine, each ejector mechanism including an elevator bar for supporting the work during transfer from machine to machine and for depositing the work in its machine, means operable by the ejector bar for initiating automatic operation of its machine after placing a work piece therein, means connecting the elevator bars whereby they are simultaneously operated and a single power source therefor, and means for simultaneously traversing the transfer mechanisms including the elevator bar between machines.

7. In a mechanism of the class described the combination with a manufacturing line including a plurality of adjacent machine tools, each machine tool including a work support, a tool, and an ejector mechanism, of automatic means for cyclically actuating the work support and tool to produce a work piece by each machine and effect its ejection from the machine on completion thereof, a work loading and transfer mechanism for each machine operable between its machine and the preceding machine, said loading and transfer mechanism including an elevator bar for depositing work on the work support of its machine and for transferring the work from the ejector mechanism of the preceding machine to the work support of its machine, said elevator bar including work engaging fingers, and means operable by the elevator bar for releasing the work from the fingers when in position to deposit said work on the work support and for engaging the work when in position to remove same from the ejector mechanism.

8. In a mechanism of the class described the combination with a manufacturing line including a plurality of adjacent machine tools, said tools each including a work support, a tool, and a work ejecting mechanism, of automatically actuable means for effecting the cyclic operation of the work support to support and rotate the work during the operation thereon by the tool and eject the work from the machine at the conclusion of the tooling operation, a transfer mechanism for each machine tool operable between adjacent machines for transferring the work from the ejector mechanism of the machine next in line, and means operable by the transfer mechanism for initiating the cyclic operation of its machine tool after a work piece has been mounted on its work support whereby the machine is operating during the transfer of the previously finished work piece.

9. In a mechanism of the class described the combination with a manufacturing line including a plurality of adjacent machine tools, said tools each including a work support, a tool, and a work ejecting mechanism, of automatically actuable means for effecting the cyclic operation of the work support to support and rotate the work during the operation thereon by the tool and eject the work from the machine at the conclusion of the tooling operation, a transfer mechanism for each machine tool operable between adjacent machines for transferring the work from the ejector mechanism of the machine next in line, means operable by the transfer mechanism for initiating the cyclic operation of its machine tool after a work piece has been mounted on its work support whereby the machine is operating during the transfer of the previously finished work piece, and means for simultaneously actuating the transfer mechanisms for depositing the work on its support whereby all of the machines are operating simultaneously.

10. In a mechanism of the class described the combination with a manufacturing line including a plurality of adjacent machine tools, said tools each including a work support, a tool, and a work ejecting mechanism, of automatically actuable means for effecting the cyclic operation of the work support to support and rotate the work during the operation thereon by the tool and eject the work from the machine at the conclusion of the tooling operation, a transfer mechanism for each machine tool operable between adjacent machines for transferring the work from the ejector mechanism of the machine next in line, means operable by the transfer mechanism for initiating the cyclic operation of its machine tool after a work piece has been mounted on its work support whereby the machine is operating during the transfer of the previously finished work piece, means for simultaneously actuating the transfer mechanisms for depositing the work on its support whereby all of the machines are operating simultaneously, and means for simultaneously actuating all of the transfer mechanisms to thereby simultaneously transfer the work from one machine to the next.

11. In a transfer mechanism for use in a machine tool manufacturing line, which comprises two or more machines including a track between each two machines, a carrier mounted on each track for movement there along from one machine to the next, an elevator bar associated with each carrier for vertical movement relative to the carrier, a reversible prime mover for simultaneously actuating the elevator bars, means associated with each machine for supporting a work piece for engagement by the elevator bars, means associated with each machine for receiving the work from the elevator bars, a reversible controller for the reversible prime mover, and means associated with the machine and operable thereby for actuating the controller in one direction to effect the operation of the elevator bar for depositing a work piece on the machine work receiving means.

12. In a transfer mechanism for use in a machine tool manufacturing line, which comprises two or more machines including a track between each two machines, a carrier mounted on each track for movement there along from one machine to the next, an elevator bar associated with each carrier for vertical movement relative to the carrier, a reversible prime mover for simultaneously actuating the elevator bars, means associated with each machine for supporting a work piece for engagement by the elevator bars, means associated with each machine for receiving the work from the elevator bars, a reversible controller for the reversible prime mover, means associated with the machine and operable thereby for actuating the controller in one direction to effect the operation of the elevator bar for depositing a work piece on the machine work receiving means, and means for actuating the controller in a reverse direction operable by one of the bars after the work pieces have been deposited on the machines.

13. In a transfer mechanism for use in a machine tool manufacturing line, which comprises two or more machines including a track between each two machines, a carrier mounted on each track for movement there along from one machine to the next, an elevator bar associated with each carrier for vertical movement relative to the carrier, a reversible prime mover for simultaneously actuating the elevator bars, means associated with each machine for supporting a work piece for engagement by the elevator bars, means associated with each machine for receiving the work from the elevator bars, a reversible controller for the reversible prime mover, means associated with the machine and operable thereby for actuating the controller in one direction to effect the operation of the elevator bar for depositing a work piece on the machine work receiving means, means for actuating the controller in a reverse direction operable by one of the bars after the work pieces have been deposited on the machines, a reversible prime mover for simultaneously traversing all of the carriages relative to their tracks, and means sequentially operable by one of the elevator bars for reversely traversing the carriers relative to the tracks.

14. A transfer mechanism for use with machine tool manufacturing lines which include two or more machines, the combination of a track between adjacent machines, a carrier mounted on each track for reverse movement relative thereto, an elevator bar carried by each carrier for vertical movement relative thereto, work supporting fingers on the elevator bar, a reversible prime mover for reversely actuating the elevator bars relative to their carriers, a controller for the prime mover, means for actuating said controller in one direction to effect a lowering of the elevator bars to dispose a work piece between the work carrying fingers thereof, yielding means for actuating the fingers to grip the work there between, means operable by one of the elevator bars for actuating the controller in the opposite direction to effect an elevation of the bars and work carried thereby, means for traversing the carriers and elevator bars relative to the track and including a reversible prime mover, a controller for said reversible prime mover, and means operable by one of the elevator bars for effecting the actuation of the controller in a direction to effect the traverse of the work from one machine to the next.

15. In a mechanism of the class described the combination of a manufacturing line including a plurality of adjacent machine tools, each machine tool including a work supporting and rotating mechanism, a tool, and an ejecting mechanism, automatic means for cyclically operating the work supporting and rotating mechanism, effecting a relative feed between the tool and work piece, stopping of the rotation of the work and effecting a release thereof and ejecting the work from the machine, a transfer mechanism for each machine for depositing a work piece in its machine and movable to the preceding machine to pick up the work piece finished thereby and transfer same to its machine, means for actuating the transfer mechanism for depositing a work piece in operative relation with the work supporting and rotating mechanism of its machine, and means operable by each transfer mechanism for initiating the automatic cyclic operation of its machine after it deposits its work on the work support whereby the machines are in operation during the transfer of the work from the preceding machine.

16. In a mechanism of the class described the combination of a manufacturing line including a plurality of adjacent machine tools, each machine tool including a work supporting and rotating mechanism, a tool, and an ejecting mechanism, automatic means for cyclically operating the work supporting and rotating mechanism, effecting a relative feed between the tool and work piece, stopping of the rotation of the work and effecting a release thereof and ejecting the work from the machine, a transfer mechanism for each machine for depositing a work piece in its machine and movable to the preceding machine to pick up the work piece finished thereby and transfer same to its machine, means for actuating the transfer mechanism for depositing a work piece in operative relation with the work supporting and rotating mechanism of its machine, means operable by each transfer mechanism for initiating the automatic cyclic operation of its machine after it deposits its work on the work support whereby the machines are in operation during the transfer of the work from the preceding machine, and interlocking means operable by the ejecting mechanism of each machine for effecting the depositing of the work by the transfer mechanisms on the work supports after all machines have completed their operations.

17. In a transfer or work handling mechanism of the class described the combination of a carrier, means for transferring said carrier between two points, means for raising and lowering said carrier at each of said points for effecting a picking up of the work piece at one point and depositing the work piece at the other point, automatic means for effecting the said operations of the transferring and raising and lowering means of the carrier, a machine tool at each point of the transfer movement of the carrier, an ejector mechanism associated with each machine tool from which the work is received by the carrier, and a work support associated with each machine tool for receiving the work from the carrier.

18. In a transfer or work handling mechanism of the class described the combination of a carrier, means for transferring said carrier between two points, means for raising and lowering said carrier at each of said points for effecting a picking up of the work piece at one point and depositing the work piece at the other point, automatic means for effecting the said operations of the transferring and raising and lowering means of the carrier, a machine tool at each point of the transfer movement of the carrier, an ejector mechanism associated with each machine tool from which the work is received by the carrier, a work support associated with each machine tool for receiving the work from the carrier, automatically operable means associated with each machine tool for effecting a tooling operation on the work, and means initiating the operation of the machine tool operable by the carrier.

19. In a transfer mechanism of the class described for use in manufacturing lines comprising two or more machine tools, each having a work support, an unfinished work stack at the beginning of the line and a finished work stack at the end of the line, the combination with automatically operable means associated with each machine tool for effecting a tooling operation on the work piece associated therewith, and an ejector mechanism associated with each machine tool for ejecting the work piece therefrom at the conclusion of the tooling operation, of a transfer mechanism operable between adjacent machine tools, the unfinished work stack and first machine tool and finished work stack and last machine tool for receiving a work piece from the ejector mechanism of the preceding machine tool and unfinished work stack and for depositing the said work on the succeeding machine tool and the finished work stack.

20. In a transfer mechanism of the class described for use in manufacturing lines comprising two or more machine tools, each having a work support, an unfinished work stack at the beginning of the line and a finished work stack at the end of the line, the combination with automatically operable means associated with each machine tool for effecting a tooling operation on the work piece associated therewith, and an ejector mechanism associated with each machine tool for ejecting the work piece therefrom at the conclusion of the tooling operation, of a transfer mechanism operable between adjacent machine tools, the unfinished work stack and first machine tool and finished work stack and last machine tool for receiving a work piece from the ejector mechanism of the preceding machine tool and unfinished work stack and for depositing the said work on the succeeding machine tool and the finished work stack, and means operable by the transfer mechanism while depositing a work piece on the machine tool support for initiating the operation of the machine tool whereby the transferring of the work is accomplished during the said operation of the machine tools.

21. In a transfer mechanism of the class described for use in manufacturing lines comprising two or more machine tools, each having a work support, an unfinished work stack at the beginning of the line and a finished work stack at the end of the line, the combination with automatically operable means associated with each machine tool for effecting a tooling operation on the work piece associated therewith and an injector mechanism associated with each machine tool for ejecting the work piece therefrom at the conclusion of the tooling operation, of a transfer mechanism operable between adjacent machine tools, the unfinished work stack and first machine tool and finished work stack and last machine tool for receiving a work piece from the ejector mechanism of the preceding machine tool and unfinished work stack and for depositing the said work on the succeeding machine tool and the finished work stack, said transfer mechanism including a carrier adapted to be positioned in one plane while receiving and depositing the work and in a second plane while transferring same, means associated with the carrier for effecting the operation of the carrier between the said planes before and after its transfer movement, and means synchronizing the said movements of the carrier.

22. In a transfer mechanism of the class described for use in manufacturing lines comprising two or more machine tools, each having a work support, an unfinished work stack at the beginning of the line and a finished work stack at the end of the line, the combination with automatically operable means associated with each machine tool for effecting a tooling operation on the work piece associated therewith, and an ejector mechanism associated with each machine tool for ejecting the work piece therefrom at the conclusion of the tooling operation, of a transfer mechanism operable between adjacent machine tools, the unfinished work stack and first machine tool and finished work stack and last machine tool for receiving a work piece from the ejector mechanism of the preceding machine tool and unfinished work stack and for depositing the said work on the succeeding machine tool and the finished work stack, said transfer mechanism including a carrier adapted to be positioned in one plane while receiving and depositing the work and in a second plane while transferring same, means associated with the carrier for effecting the operation of the carrier between the said planes before and after its transfer movement, means synchronizing the said movements of the carrier, and means operable by the transfer mechanism and its carrier for initiating the operation of its machine tool after depositing a work piece on its work support.

23. In a transfer mechanism of the class described for use in manufacturing lines comprising two or more machine tools, each having a work support, an unfinished work stack at the beginning of the line and a finished work stack at the end of the line, the combination with automatically operable means associated with each machine tool for effecting a tooling operation on the work piece associated therewith, and an ejector mechanism associated with each machine tool for ejecting the work piece therefrom at the conclusion of the tooling operation, of a transfer mechanism operable between adjacent machine tools, the unfinished work stack and first machine tool and finished work stack and last machine tool for receiving a work piece from the ejector mechanism of the preceding machine tool and unfinished work stack and for depositing the said work on the succeeding machine tool and the finished work stack, said transfer mechanism including a carrier adapted to be positioned in one plane while receiving and depositing the work and in a second plane while transferring same, means associated with the carrier for effecting the operation of the carrier between the said planes before and after its transfer movement, means synchronizing the said movements of the carrier, means operable by the transfer mechanism and its carrier for initiating the operation of its machine tool after depositing a work piece on its work support, and additional means operable by the transfer mechanism and its carrier for initiating the cycle of operation of said transfer mechanism after the operation of the machine tool is initiated.

24. In a mechanism of the class described for use in a manufacturing line the combination with such a line including two or more machine tools, an unfinished work piece stack at the beginning of said line and a finished work piece stack at the end of said line, of automatically operable means associated with each machine tool for causing it to operate through one complete cycle, a plurality of transfer mechanisms, one between adjacent machine tools, one between the first machine tool and unfinished work piece stack and one between the last machine tool and finished work piece stack, automatic means for actuating each transfer mechanism through a complete cycle and then stop, means operable by each transfer mechanism for initiating the cycle of operation of its machine tool, and means operable by the machine tools for initiating the cycle of operation of the transfer mechanisms.

25. In a mechanism of the class described for use in a manufacturing line the combination with such a line including two or more machine tools, an unfinished work piece stack at the beginning of said line and a finished work piece stack at the end of said line, of automatically operable means associated with each machine tool for causing it to operate through one complete cycle, a plurality of transfer mechanisms, one between adjacent machine tools, one between the first machine tool and unfinished work piece stack and one between the last machine tool and finished work piece stack, automatic means for actuating each transfer mechanism through a complete cycle and then stop, means operable by each transfer mechanism for initiating the cycle of operation of its machine tool, and means operable by the machine tools for initiating the cycle of operation of the transfer mechanisms, the transfer mechanisms initiating means of each machine tool being interlocked whereby the said transfer mechanisms are simultaneously set in operation.

26. A work shifting mechanism for use in connection with a production line embodying a plurality of machine tools comprising work removing means individual to individual machine tools, means for actuating said means to shift a work piece from working position in a machine to a transfer station, transfer devices operable between one machine and a transfer station of another machine, and means for actuating the transfer device to shift a work piece from a transfer station of one machine to a working position with respect to a second machine.

27. A work shifting mechanism for use in connection with a production line embodying a plurality of machine tools comprising work removing means individual to individual machine tools, means for actuating said means to shift a work piece from working position in a machine to a transfer station, transfer devices operable between one machine and a transfer station of another machine, means for actuating the transfer device to shift a work piece from a transfer station of one machine to a working position with respect to a second machine, and means actuable by the work removing device for initiating actuation of the work transferring means.

28. A work shifting mechanism for use in connection with a production line embodying a plurality of machine tools comprising work removing means individual to individual machine tools, means for actuating said means to shift a work piece from working position in a machine to a transfer station, transfer devices operable between one machine and a transfer station of another machine, means for actuating the transfer device to shift a work piece from a transfer station of one machine to a working position with respect to a second machine, a work contacting device for engagement with a work piece while in operative position within an individual machine, and means controlled by said contacting device for initiating the cycle of removal and transfer of the work piece.

29. A work shifting mechanism for use in connection with a production line embodying a plurality of machine tools comprising work removing means individual to individual machine tools, means for actuating said means to shift a work piece from working position in a machine to a transfer station, transfer devices operable between one machine and a transfer station of another machine, means for actuating the transfer device to shift a work piece from a transfer station of one machine to a working position with respect to a second machine, a work contacting device for engagement with a work piece while in operative position within an individual machine, means controlled by said contacting device for initiating the cycle of removal and transfer of the work piece, said transfer mechanism having a normal work supporting position adjacent the machine to which work is to be transferred, and means actuable by the work removing device for moving the transfer mechanism from said position to insert a work piece within the machine.

30. In a transfer mechanism of the character described, the combination with a laterally shiftable member of a carrier bar supported thereby for reciprocation relative thereto, means for effecting translation of the member and reciprocation of the bar, a control mechanism for certain of said movements carried by the member and including an intermittently advanceable shaft, and connections between the reciprocating bar and said shaft for effecting intermittent rotation of the shaft in accordance with reciprocations of the bar.

31. The combination with a plurality of machine tools having substantially aligned work holders for successive operative engagement with an individual work piece, of means providing substantially aligned transfer stations for the several machines, means for shifting the work piece from the work position to the transfer station of an individual machine, work transferring mechanism operable to shift a work piece from a transfer station of one machine to an operating position as respects an adjacent machine, guide means diagonally disposed as respects the aligned work supports and transfer stations, and means for reciprocating the transfer mechanism in a rectilinear path along said guides to convey a work piece from a transfer station of one machine to an operative position in an adjacent machine.

32. The combination with a plurality of machine tools having substantially aligned work holders for successive operative engagement with an individual work piece, of means providing substantially aligned transfer stations for the several machines, means for shifting the work piece from the work position to the transfer station of an individual machine, work transferring mechanism operable to shift a work piece from a transfer station of one machine to an operating position as respects an adjacent machine, guide means diagonally disposed as respects the aligned work supports and transfer stations, means for reciprocating the transfer mechanism in a rectilinear path along said guides to convey a work piece from a transfer station of one machine to an operative position in an adjacent machine, a supplemental guide means having portions parallel and non-parallel to the first mentioned guide means and connections between the work transfer mechanism and said supplemental guide means for effecting a twisting of the transfer device during translation whereby an end for end reversal of the work is effected between machines.

33. In a line production mechanism of the character described, the combination with a plurality of spaced work machining elements, of a work receiving support, and means providing a transfer station adjacent each of said elements, a work transferring device including means operative to raise a work piece at one transfer point, means for translating the raised work piece to a succeeding work support, means for reversely shifting the work to deposit the same on the support, and a retractor mechanism including means for raising the work from the support, and means for shifting the raised work piece to a subsequent transfer station, substantially as and for the purpose described.

34. In a line production mechanism of the character described, the combination with a plurality of spaced work machining elements, of a work receiving support and means providing a transfer station adjacent each of said elements, a work transferring device including means operative to raise a work piece at one transfer point, means for translating the raised work piece to a succeeding work support, means for reversely shifting the work to deposit the same on the support, a retractor mechanism including means for raising the work from the support, means for shifting the raised work piece to a subsequent transfer station, means for determining the sequential movements of said parts in predetermined sequence with respect to an individual work piece.

35. The combination with a machine tool, of means for removing a machined work piece therefrom, additional means for presenting a work piece thereto, means operable by the work removing mechanism for actuating the transfer mechanism to deliver a work piece to the tool, means for automatically initiating the machining operation of the tool, and additional control means for shifting the work transfer mechanism through a cycle including retraction, engagement and substantial presentation of a new work piece during said machining operation.

MILLARD ROMAINE.
ERWIN G. ROEHM.